United States Patent [19]
Yamamura

[11] Patent Number: 5,483,659
[45] Date of Patent: Jan. 9, 1996

[54] APPARATUS FOR CONTROLLING A SIGNAL PROCESSING SYSTEM TO OPERATE IN HIGH AND LOW SPEED MODES

[76] Inventor: Kimio Yamamura, c/o Tokyo Office of Hudson Soft Co. Ltd., Hudson Building 1-1, Ichigayatamachi 3-chome, Shinjuku-ku, Tokyo, Japan

[21] Appl. No.: 137,213

[22] Filed: Oct. 18, 1993

Related U.S. Application Data

[63] Continuation of Ser. No. 876,807, Apr. 30, 1992, abandoned, which is a continuation of Ser. No. 696,274, May 2, 1991, abandoned, which is a continuation of Ser. No. 247,440, Sep. 6, 1988, abandoned.

[30] Foreign Application Priority Data

Sep. 14, 1987 [JP] Japan .................. 62-230673
Sep. 14, 1987 [JP] Japan .................. 62-230675

[51] Int. Cl.⁶ .................................. G06F 9/00
[52] U.S. Cl. ............... 395/800; 395/550; 364/231.5; 364/270; 364/DIG. 1
[58] Field of Search ................ 395/550, 800, 395/275, 500; 364/231.5, 270, DIG. 1

[56] References Cited

U.S. PATENT DOCUMENTS

| | | | |
|---|---|---|---|
| 4,562,535 | 12/1985 | Vincent | 364/200 |
| 4,615,005 | 9/1986 | Maejima | 364/200 |
| 4,631,661 | 12/1986 | Eibach et al. | 364/200 |
| 4,654,784 | 3/1987 | Campanini | 364/200 |
| 4,663,708 | 5/1987 | Taub | 364/200 |
| 4,674,031 | 6/1987 | Siska, Jr. | 395/750 |
| 4,674,037 | 6/1987 | Funabashi et al. | 364/200 |
| 4,727,491 | 2/1988 | Culley | 364/200 |
| 4,821,229 | 4/1989 | Jauregui | 364/900 |
| 4,893,271 | 1/1990 | Davis et al. | 395/750 |
| 4,930,067 | 5/1990 | Nakamura | 364/200 |
| 5,086,387 | 2/1992 | Arroyo et al. | 395/550 |

FOREIGN PATENT DOCUMENTS 103426  6/1985  Japan ...................... 364/707

OTHER PUBLICATIONS

Sidney Soclof, Application of Analog Integrated Circuit, 1985, pp. 228–229.

*Primary Examiner*—Eric Coleman
*Assistant Examiner*—John Harrity

[57] ABSTRACT

In an apparatus for controlling a signal processing system to operate in high and low speed modes, a control unit determines a speed of system clock signals in accordance with the interpretation of a program when external clock signals are received. When a speed of the system clock signals is determined, the control unit controls the production of the system clock signals of a frequency dependent on the speed. As a result, a peripheral circuit of a low speed can be controlled to operate without the necessity of a complicated interface circuit, and a system of a high speed such as a system for the so-called television game can also be controlled to operate. Further, a limitation on an operation speed of a peripheral circuit is excluded so that an expansion of a signal processing system can be easy to be performed. Still further, all circuits of the signal processing system can be under operation states because a low speed mode is first realized when a power supply is turned on.

5 Claims, 4 Drawing Sheets

5,483,659

APPARATUS FOR CONTROLLING A SIGNAL PROCESSING SYSTEM TO OPERATE IN HIGH AND LOW SPEED MODES

This application is a continuation of application Ser. No. 07/876,807 filed Apr. 30, 1992 now abandoned, which is a continuation of application Ser. No. 07/696,274, filed May 2, 1991 now abandoned, which is a continuation of application Ser. No. 07/247,440 filed Sep. 6, 1988 now abandoned.

FIELD OF THE INVENTION

The invention relates to an apparatus for controlling a signal processing system to operate in high and low speed modes, and more particularly to an apparatus for controlling a signal processing system to operate in high and low speed modes in which system clock signals of a predetermined speed are produced in accordance with a speed of an operation mode.

BACKGROUND OF THE INVENTION

One of conventional apparatus for controlling a signal processing system to operate in high and low speed modes comprises a circuit for producing system clock signals and a control unit for controlling the signal processing system to operate in a predetermined mode. The circuit for producing system clock signals is controlled to produce system clock signals of a high or low speed in accordance with a high or low speed operation mode by the control unit. Therefore, the signal processing system can be switched over to operate in a low speed operation mode in accordance with system clock signals of a low speed in a case where a peripheral circuit of a low speed operation is included in the signal processing system.

According to the conventional apparatus for controlling a signal processing system to operate in high and low speed modes, however, there is a disadvantage that signals which are processed in accordance with high and low speed clock signals compete with each other on a bus in a case where a charge-over command by which the low speed operation mode is changed over to the high speed operation mode is produced in accordance with an error or a misinterpretation of a program when the low speed operation mode is being conducted. A further disadvantage is that a complicated interface circuit is required to be provided in a case where a peripheral circuit of a low speed operation is controlled to operate. A still further disadvantage is that an apparatus for controlling a signal processing system to operate in a low speed mode can not control a system of a high speed operation mode such as a system for the so-called television game.

SUMMARY OF THE INVENTION

Accordingly, it is an object of the invention to provide an apparatus for controlling a signal processing system to operate in high and low speed modes in which signals which are processed in accordance with high and low clock signals are avoided to compete with each other on a bus.

It is a further object of the invention to provide an apparatus for controlling a signal processing system to operate in high and low speed modes a complicated interface circuit is not require to be provided even in a case where a peripheral circuit of a low operation speed is controlled to operate.

It is a still further object of the invention to provide an apparatus for controlling a signal processing system to operate in high and low speed modes in which a speed of system clock signals is controlled to change in accordance with a program.

According to the invention, an apparatus for controlling a signal processing system to operate in high and low speed modes comprises a memory in which a predetermined program is stored, a circuit for producing system clock signals, and a control unit for the system to operate in a predetermined mode. The predetermined program stored in the memory includes a content by which a speed of system clock signals is determined, and the circuit for producing system clock signals produces system clock signals of a high or low speed in accordance with the division of external clock signals by a predetermined frequency dividing ratio. The control unit interprets the program to determine a speed of a system operation thereby controlling the circuit to produce system clock signals of an above determined speed, and produces a mode signal corresponding to the speed.

BRIEF DESCRIPTION OF THE DRAWINGS

The invention will be explained in more detail in conjunction with appended drawings wherein.

DESCRIPTION OF THE PREFERRED EMBODIMENTS

Figure 1:
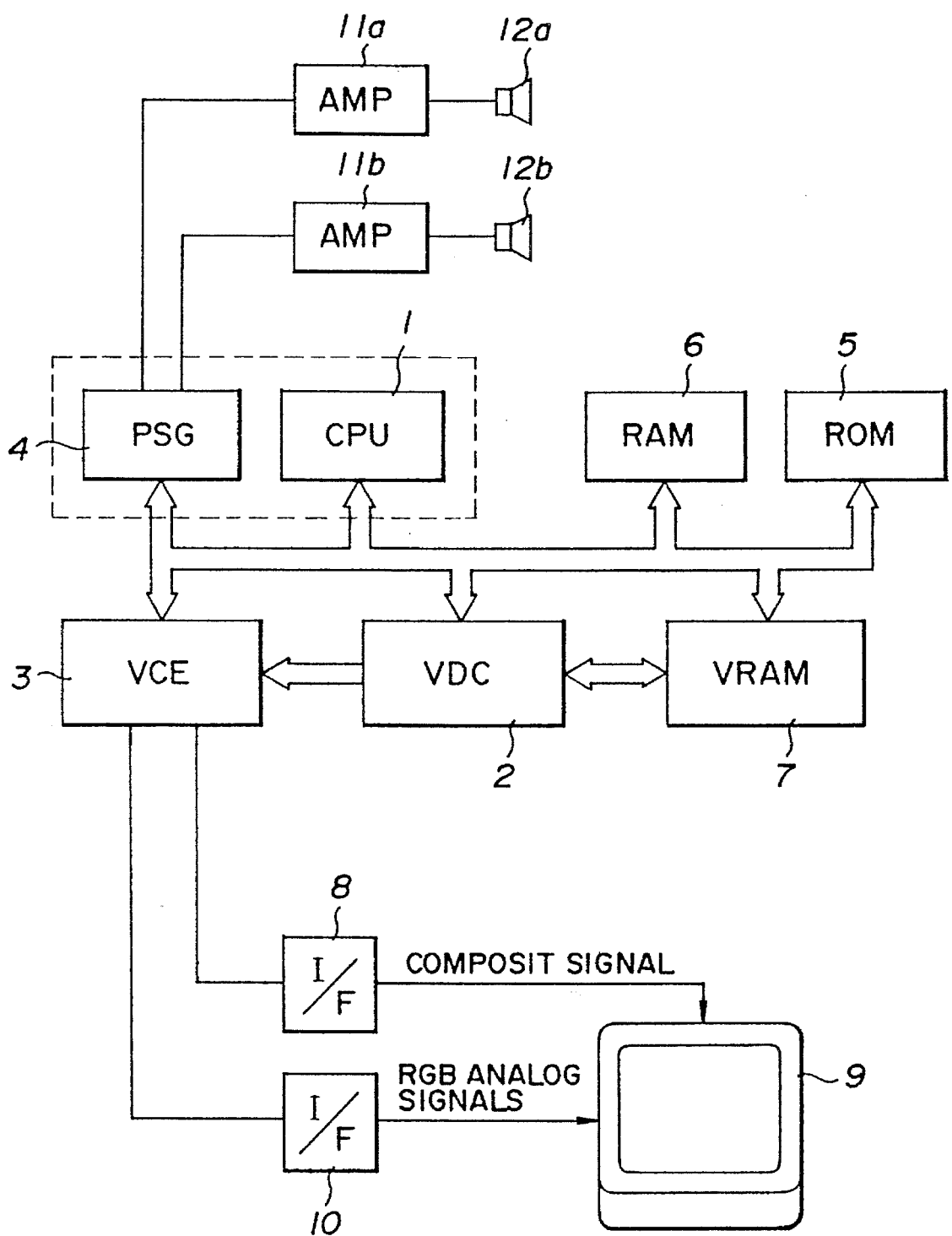
FIG. 1 is a block diagram showing an image displaying apparatus to which an apparatus for controlling a signal processing system to operate in high and low speed modes according to the invention is applied.

In FIG. 1, there is shown an apparatus for displaying a color image to which an apparatus for controlling a signal processing system (CPU) 1 according to the invention is applied. In the apparatus for displaying a color image, a CPU 1 performs a predetermined control in accordance with a program stored in ROM 5 so that data, arithmetical results etc. are stored into a RAM 6 temporarily. A video display controller 2 is provided therein to supply a video color encoder 3 with video data of a story, for instance, for a so-called television game read from a video RAM (VRAM) 7 in accordance with a control of the CPU 1 which deciphers a program for the television game stored in the ROM 5. The video color encoder 3 to which the video data are supplied produces RGB analog signals obtained in accordance with color data stored therein, or produces video color signal including a luminance signal and color difference signals obtained in accordance with the color data. Further, a programable sound generator 4 is provided therein to produce analog sound signals as left and right stereo sounds in accordance with a content of the ROM 5 which is supplied through the CPU 1 thereto. The video color signal produced in the video color encoder 3 is supplied through an interface 8 to a receiving circuit of a television set 9 as a composite signal, and the RGB analog signal is supplied through an interface 10 directly to a CRT of the television set 9 which functions as an exclusive use monitor means. On the other hand, the left and right analog sound signals are supplied through amplifiers 11a and 11b to speakers 12a and 12b to produce sounds.

Figure 2:
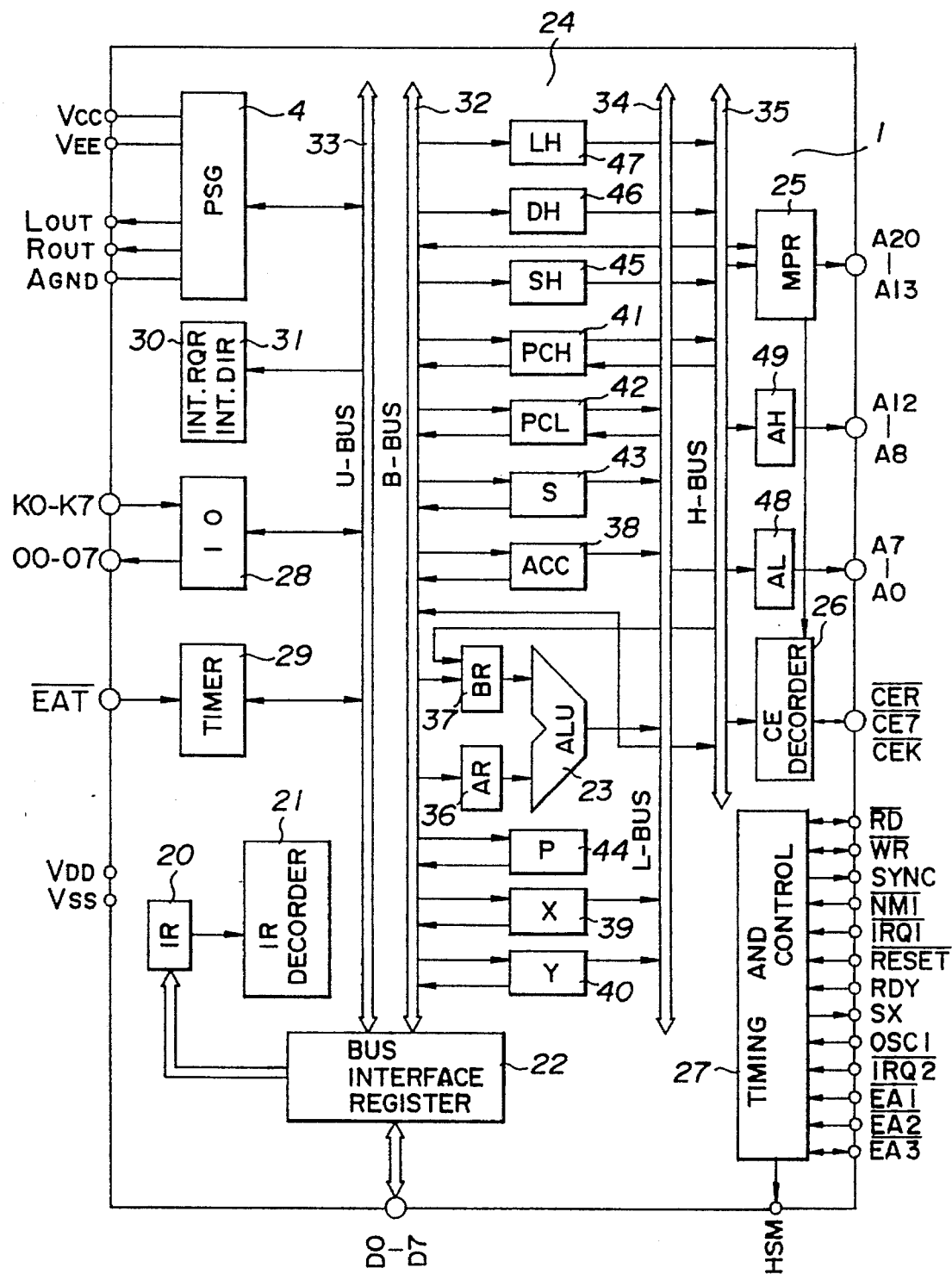
FIG. 2 is a block diagram showing an apparatus for controlling a signal processing system to operate in high and low speed modes in an embodiment according to the invention.

FIG. 2 shows the CPU 1 and the programable sound generator 4 as encircled by a dotted line in FIG. 1. The CPU 1 in which an apparatus for controlling a signal processing system in the embodiment is included and comprises an instruction register 20, an instruction decoder 21, a bus interface register 22, an arithmetic and logic unit (ALU) 23, a set of registers 24, a mapping register 25, a chip enable decoder 26, a timing and control unit 27, an input and output port 28, a timer 29, an interrupt request register 30, an interrupt disable register 31, and so on. These units will be explained as follows.

(1) Instruction Register 20

The register 20 is loaded with an instruction code at an instruction fetch cycle.

(2) Instruction Decoder 21

The decoder 21 performs a sequential operation determined in accordance with an output of the instruction register 20, an interrupt input from a peripheral circuit or a reset input, and further performs a control of a brunch command changing a flow of a program in accordance with informations of a status register described later.

(3) Bus Interface Register 22

The register 22 controls a transfer of data among a B-bus 32, a U-bus 33 and an external bus D0 to D7. The ALU 23 and the set of registers 24 are connected by the B-bus 22 and the U-bus 33, and is connected to internal peripheral circuits. Further, a L-bus 34 for transferring lower eight bits of a logical address and a H-bus 35 for transferring upper eight bits of the logical address are provided. A logical address low register 48 is connected to the L-bus 34, and a logical address high register 49 is connected to the H-bus 35.

(4) ALU 23

The ALU 23 is provided with an A register 36 and a B register 37, and performs all of arithmetic and logical operation. The A and B registers 36 and 37 are loaded with one or two data so that an arithmetic operation is performed in accordance with a control signal of the instruction decoder 21 to supply one of the B, L and H-buses 32, 34 and 35 with a result of the arithmetic operation.

(5) Set of Registers 24

The set of registers 24 comprises following ten registers each being of eight bits.
(a) accumulator 38

The accumulator 38 is a wide use register which plays the most important role in an arithmetic and logical operation to be conducted when a memory arithmetic flag T of a status register described later is "0". Data thereof is supplied to an input of the ALU 23, and a result of the arithmetic is stored therein. The accumulator 38 is also used for a transfer of data between memories and between a memory and a peripheral circuit, and for a count of a data block length when a block transfer of data is performed. A lower data of the length are stored therein after data stored therein at the very moment are evacuated into a stack region of the RAM 6.
(b) X and Y registers 39 and 40

The registers 39 and 40 are wide use registers which are mainly used for an index addressing. The X register 39 is used for a designation of an address on page "0" of a memory which is a destination of an arithmetic operation, and for a storage of lower data of a source address after data stored therein at the very moment are evacuated into a stack region of the RAM 6 when a block transfer of data is performed. On the other hand, the Y register 40 stores lower data of a destination address after data stored therein at the very moment are evacuated into a stack region of the RAM 6 when a block transfer of data is performed.
(c) program counters 41 and 42

An up counter of sixteen bits is composed of the program counter 41 of upper eight bits and the program counter 42 of lower eight bits. The up counter is automatically incremented in accordance with the conduct of a command to designate an address of a command or operand to be next conducted. Contents of the counters 41 and 42 are evacuated into a stack region of the RAM 6 in a case where a command of sub-routine is conducted, and an interrupt is produced, or after an interruption command of a software is conducted.
(d) stack pointer 43

The stack pointer 43 designates lower eight bits of the highest address on a stack region of the RAM 6, and is decremented after the pushing of data into the stack region and incremented before the pulling of the data from the stack region. For instance, two hundreds fifty-six (256) bytes of addresses "2100" to "21FF" are allocated to the stack region in a logical address.
(e) source high register 45, destination high register 46, and length high register 47

These registers function in case of a command of a block transfer. The source high register 45 provides an upper byte of a source address to designate the source address together with a content of the X register 39. The destination high register 46 provides an upper byte of a destination address to designate the destination address together with a content of the Y register 40. The length high register 47 provides upper eight bits for a down counter together with a content of the accumulator 38 so that a length of a block transfer is counted by a byte unit.

(6) Mapping Register 25

The mapping register 25 is composed of eight registers each being of eight bits to convert a logical address of sixteen bits to a physical address of twenty-one bits, and is selected by upper three bits of the H-bus 35.

(7) Chip Enable Decoder 26

The chip enable decoder 26 provides chip enable outputs for following peripheral circuits by decoding upper eleven bits of a physical address.
(a) a chip enable for the RAM 6 . . . CER
(b) a chip enable for the video display controller 2 . . . $\overline{CE7}$
(c) a chip enable for the video color encoder 3 . . . $\overline{CEK}$
(d) a chip enable for the programable sound generator 4 . . . $\overline{CEP}$
(e) a chip enable for the timer 29 . . . $\overline{CET}$
(f) a chip enable for the input and output port . . . $\overline{CEIO}$
(g) a chip enable for the interrupt request register 30 and the interrupt disable register 31 . . . $\overline{CECG}$

(8) Timing and Control Unit 27

The unit 27 is connected to following terminals.
(a) $\overline{RD}$ terminal

A read timing signal is supplied through the $\overline{RD}$ terminal at a reading cycle.

(b) $\overline{WR}$ terminal

A write timing signal is supplied through the $\overline{WR}$ terminal at a writing cycle.

(c) SYNC terminal

A synchronous signal of "high" is supplied through the SYNC terminal at an instruction fetch cycle, that of "low" is supplied therethrough at a system reset timing.

(d) $\overline{NMI}$ terminal

A non-maskable interrupt is produced when $\overline{NMI}$ input signal is supplied through the $\overline{NMI}$ terminal. A sub-routine call is conducted by reading lower address from the logic address "FFFC" and upper address from the logical address "FFFD" when a command which is conducted in a program is completed.

(e) $\overline{IRQ1}$ and $\overline{IRQ2}$ terminals

A sub-routine call is conducted by reading lower address from the logical 1 address "FFF8" and upper address from the logical address "FFF9" when $\overline{IRQ1}$ input becomes "low" in a case where a corresponding bit in the interrupt disable register 31 is "0", and a corresponding bit in the status register 44 is "0". At this time, the corresponding bit is set in the status register 44, and other corresponding bits are reset therein.

A sub-routine call is conducted by reading lower address from the logical address "FFF6" and upper address from the logical address "FFF7" when $\overline{IRQ2}$ input becomes "low" in a case where a corresponding bit in the interrupt disable register 31 is "0", and a corresponding bit in the status register 44 is "0". At this time, the corresponding bit is set in the status register 44, and other corresponding bits are reset therein.

(f) $\overline{REST}$ terminal

A program is started by reading lower address from the physical address "001FFE" and upper address from the physical address "001FFF" when a $\overline{RESET}$ input becomes "low".

(g) RDY terminal

The CPU1 is started to operate when a RDY input is changed from "low" to "high".

(h) SX terminal

A complementary signal of a system clock signal is supplied through the SX terminal.

(i) OSCI terminal

An external clock signal is input through the OSCI terminal.

(j) $\overline{EA1}$ to $\overline{EA3}$ terminals

These are input terminals for a test of the CPU1.

(k) HSM terminal

A speed signal of "high" is supplied through the HSM terminal in case of a high speed mode of 21.47727 MHz/3, and that of "low" is supplied therethrough in case of a low speed mode of 21.47727 MHz/12.

(9) Input and Output Port 28

The port 28 is connected to following terminals.

(a) K0 to K7 terminals

The terminals are input ports from which data are written in accordance with the conduct of a reading cycle in regard to the physical addresses "1FF000" to "1FF3FF".

(b) 00 to 07 terminals

The terminals are output ports with latches to which data are supplied in accordance with the conduct of a writing cycle in regard to the physical addresses "1FF000" to "1FF3FF".

(10) Timer 29

The timer 29 is connected to a test input terminal $\overline{EAT}$ for the CPU1 and provides a timer signal through the U-bus thereto.

(11) Interrupt Request Register 30

The register 30 is of eight bits among which five bits are not used, while the remaining two bits are "1" to show the $\overline{IRQ1}$ and $\overline{IRQ2}$ terminals "low" and the remaining one bit is "1" to show a timer interrupt caused. The register 30 is only used for "read".

(12) Interrupt Disable Register 31

The register 31 is of eight bits among which five bits are not used, while the remaining two bits are "0" to make an interrupt request of the $\overline{IRQ1}$ and $\overline{IRQ2}$ terminals disable, and the remaining one is "0" to make an interrupt request disable in accordance with the timer interrupt signal.

Next, operation of an apparatus for controlling a signal processing system to operate in high and low speed modes in the embodiment will be explained.

(1) High Speed Mode (HSM)

Figure 3:
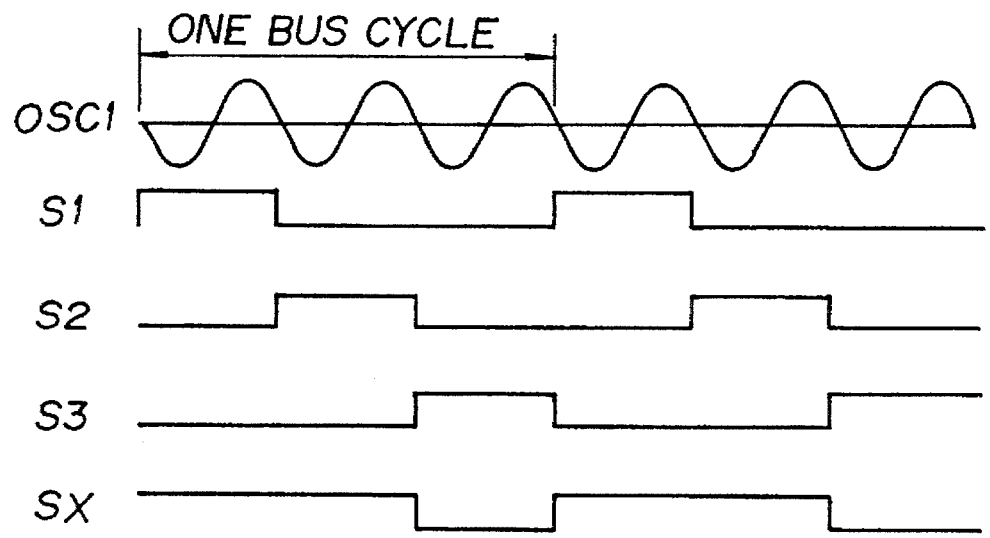
FIGS. 3 to 5 are timing charts showing operations in the embodiment.

When external clock signals of 21.47727 MHz is supplied through the terminal OSCI to the timing and control unit 27 as shown in FIG. 2, the CPU 1 interprets a program stored in ROM 5 thereby determining a high speed mode to be selected so that a command of CSH (Change Speed High) is conducted to set a high speed mode. In the high speed mode, system clock signals $S_1$, $S_2$, and $S_3$ (7.16 MHz) as shown in FIG. 3 are produced by dividing the external clock signals of 21.47727 MHz by one-third. Simultaneously, a high speed mode signal "1" is supplied through the terminal HSM to a peripheral circuit. As a result, the video display controller 2, the video color encoder 3, the programable sound generator 4 and so on which are connected to the CPU 1 are controlled to operate in the high speed mode. The system clock signals $S_1$, $S_2$, and $S_3$ are supplied as complementary signals through the terminal SX to a periphery circuit wherein one bus cycle is defined as a period from a rising edge of the system clock signal $S_1$, to a next rising edge thereof. The one bus cycle is a basic bus cycle by which a command conduct cycle is defined in each of commands.

(2) Low Speed Mode (LSM)

Figure 4:
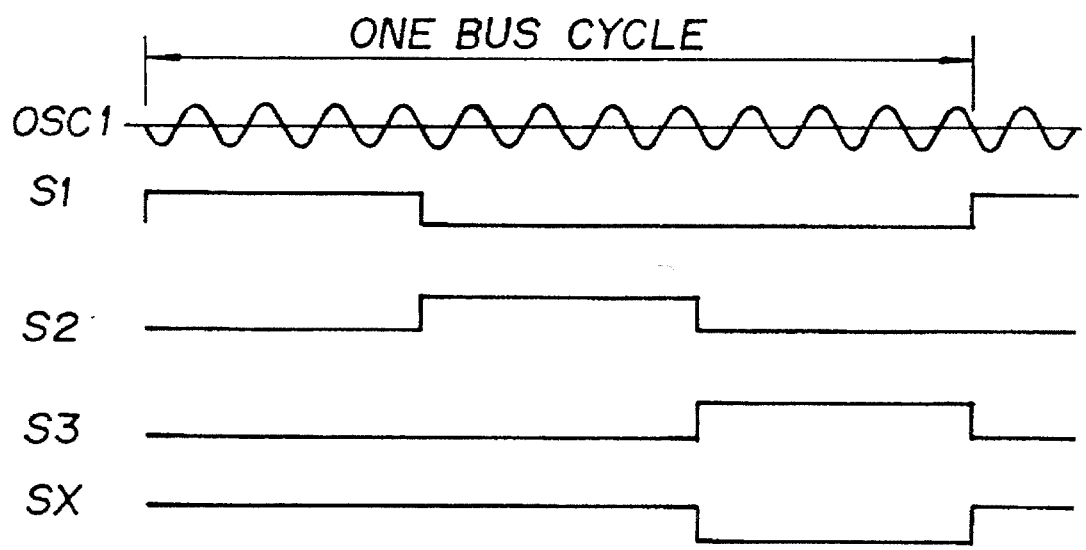

External clock signals of 21.47727 MHz which are supplied through the terminal OSCI in accordance with a command CSL (Change Speed Low) are divided by one-twelfth. As a result, system clock signals (1.79 MHz) are produced as shown in FIG. 4, and supplied as complementary signals through the terminal SX to a peripheral circuit. Simultaneously, a low speed mode signal "0" is supplied through the terminal HSM to peripheral circuit.

(3) Change Over Between Two Modes

Figure 5:
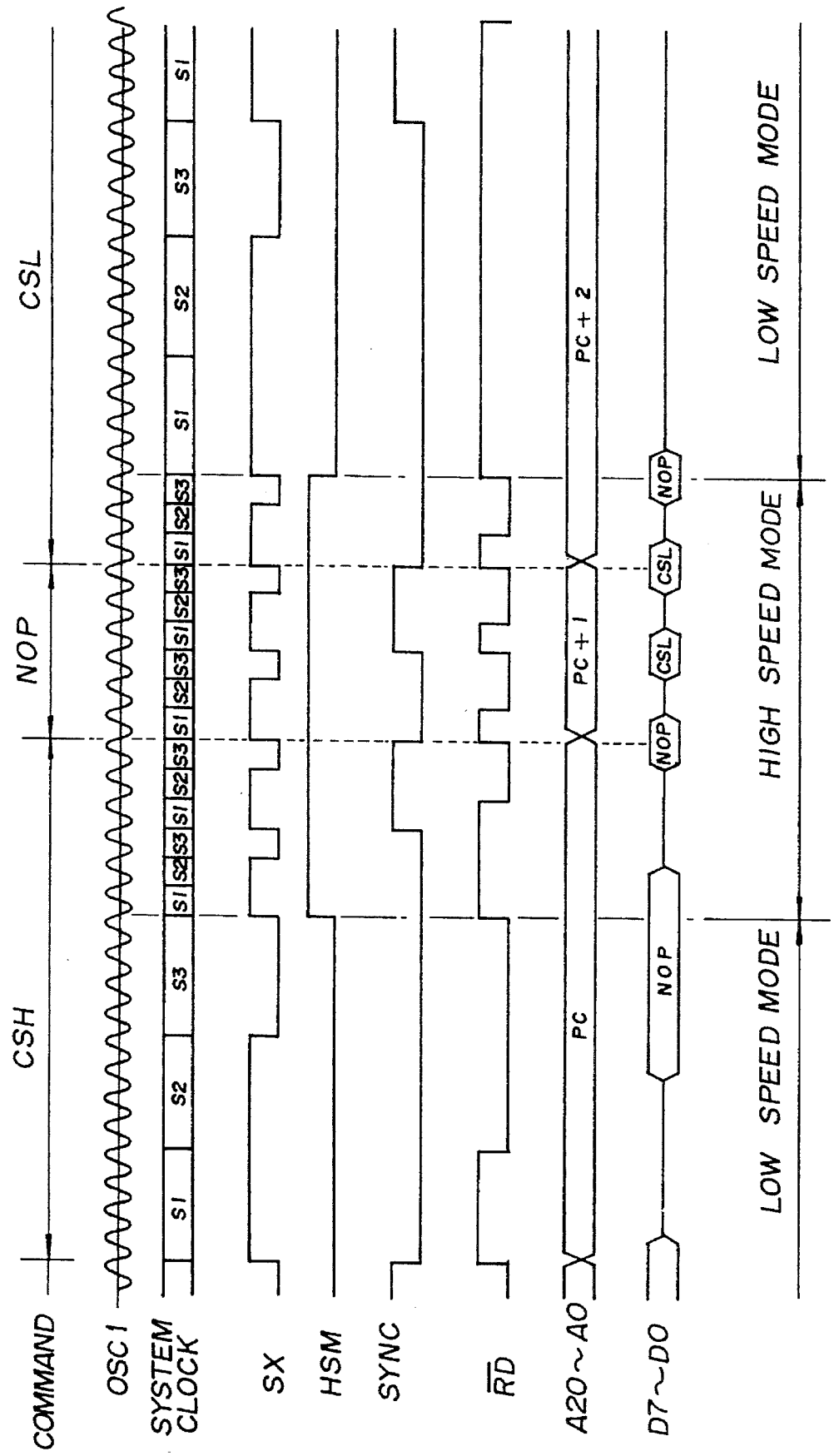

FIG. 5 shows a change over between high and low speed modes. Here, it is assumed that a command CSH by which a processing speed of the CPU 1 is set as a high speed mode, a non-operation command NOP, and a command CSL by which a processing speed of the CPU 1 is set as a low speed mode are produced at timings shown therein. A starting time at which the command CSH is produced is in a low speed mode during which system clock signals $S_1$, $S_2$ and $S_3$ are of 1.79 MHz in accordance with one-twelfth frequency division and supplied as complementary signals through the terminal SX. At this time, a mode signal HSM is "0". After one bus cycle is then elapsed, a high speed mode is realized in accordance with the command CSH so that system clock signals are of 7.16 MHz in accordance with one-third frequency division. At this time, a mode signal HSM is "1". Next, when a command CSL is produced, a low speed mode is then realized after one cycle bus thereof. During operations, a program is counted by a program counter PC.

Although the invention has been described with respect to specific embodiment for complete and clear disclosure, the appended claims are not to thus limited but are to be construed as embodying all modification and alternative constructions that may occur to one skilled in the art which fairly fall within the basic teaching herein set forth.

What is claimed is:

1. An apparatus for controlling a digital signal processing system including a plurality of peripheral devices to operate in high and low speed modes comprising:
   a memory in which a predetermined program is stored, said program including a plurality of instructions, and
   a central processing unit (CPU) including
      a clock input terminal for receiving an externally applied clock signal,
      a circuit for selectively producing system clock signals defining said high and low speed modes by selective frequency division of said externally applied clock signal by first and second divisors in response to a change speed instruction and supplying said system clock signals to said plurality of peripheral devices via a common clock output terminal, and
      control means for controlling said circuit to produce said system clock signals for said high and low speed modes in response to instructions of said program, wherein
   said control means selectively produces a mode signal corresponding to one mode selected from said high and low speed modes and supplies the selected mode signal to said plurality of peripheral devices during continuous processing operation without processing initialization,
   the digital signal processing changes from the low speed mode to the high speed mode after one bus cycle passes in accordance with said change speed instruction, and
   a non-operation command is provided between a change speed high command and a change speed low command.

2. An apparatus for controlling a signal processing system to operate in high and low speed modes according to claim 1,
   including detecting means for detecting activation of a power supply and, in response, controlling said signal processing system to operate in said low speed mode when said power supply is initially turned on.

3. An apparatus for generating a video signal to be displayed on a video monitor in response to a program, comprising:
   memory means for storing the program;
   central processing unit (CPU) including
      a clock input terminal for receiving an externally applied clock signal, and
      scaling means responsive to said externally applied clock signal and to a change speed command for selectively supplying first and second internal clock signals to a peripheral circuit via a common clock output terminal, each of said first and second clock signals having a frequency which is a different sub-multiple of the frequency of said externally applied clock signal during continuous processing without processing initialization,
   digital processing means responsive to the internally supplied clock signals for accessing said program memory and, in response, supplying a video output signal and a control signal; and
   terminal means for supplying said control signal to said peripheral circuit external to said apparatus, wherein
   the apparatus changes from a low speed mode to a high speed mode after one bus cycle passes in accordance with said change speed command, and
   a non-operation command is provided between a change speed high command and a change speed low command.

4. In an apparatus for generating a video signal to be displayed including a read only memory (ROM) and a central processing unit (CPU) having a clock input terminal for receiving an externally applied clock signal and a scaling means for selectively scaling said externally applied clock signal to provide a scaled clock signal to a peripheral device via a common clock output terminal, a method of generating the video signal responsive to a stored program having a plurality of instructions, comprising the steps of:
   storing said program in said ROM;
   receiving said externally applied clock signal at said clock input terminal of said CPU;
   said scaling means of said CPU selectively scaling said external clock signal by first and second divisors in response to a change speed command to provide a scaled clock signal to a peripheral circuit via a common clock output terminal, said scaled clock signal having a frequency which is a selected sub-multiple of said externally applied clock signal;
   retrieving an instruction of said program from said program memory in response to said scaled clock signal;
   supplying said control signal for selectively scaling said external clock signal to said peripheral circuit for control thereof in response to said program instruction during continuous processing operation without processing initialization; and
   supplying the video signal in response to the program and to said scaled clock signal, wherein
   the apparatus changes from a low speed mode to a high speed mode after one bus cycle passes in accordance with said change speed command, and
   a non-operation command is provided between a change speed high command and a change speed low command.

5. An apparatus for controlling a signal processing system to operate in high and low speed modes, comprising:
   a memory for storing a program including a high speed operation command and a low speed operation command;
   a central processing unit (CPU) including a clock input terminal for receiving an externally applied clock signal, and a circuit for selectively producing first and second system clock signals defining said high and low speed modes by selective frequency division of said externally applied clock signal by first and second divisors, and supplying the selectively produced said first and second system clock signals to a peripheral circuit via a common clock output terminal; and means for controlling said circuit for selectively producing first and second system clock signals to produce said first and second system clock signals for said high and low speed modes in response to said high and low speed operation commands; wherein said means for controlling selectively produces a mode signal corresponding to one mode selected from said high and low speed modes and supplies a selected mode signal to said peripheral circuit together with the selectively produced said first and second system clock signals, and controls said peripheral circuit to operate in said selected mode, one of said high and low speed operation commands being conducted in one bus cycle equal to one period of said system clock signal for said selected mode, so that change-over between said high and low speed modes in carried out without initialization of said signal processing system, the signal processing system changes from the low speed mode to the high speed mode after one bus cycle passes in accordance with the high speed operation command, and a non-operation command is provided between a change speed high command and a change speed low command.

* * * * *

UNITED STATES PATENT AND TRADEMARK OFFICE
CERTIFICATE OF CORRECTION

PATENT NO. : 5,483,659
DATED : January 9, 1996
INVENTOR(S) : Kimio YAMAMURA

It is certified that error appears in the above-indentified patent and that said Letters Patent is hereby corrected as shown below:

On the title page insert item [73] as follows:

--[73] Assignee: Hudson Soft Co., Ltd., Hokkaido, Japan--

Signed and Sealed this

Fourteenth Day of May, 1996

Attest:

BRUCE LEHMAN

Attesting Officer     Commissioner of Patents and Trademarks